(12) United States Patent
Burstein et al.

(10) Patent No.: US 11,940,933 B2
(45) Date of Patent: Mar. 26, 2024

(54) CROSS ADDRESS-SPACE BRIDGING

(71) Applicant: MELLANOX TECHNOLOGIES, LTD., Yokneam (IL)

(72) Inventors: Idan Burstein, Akko (IL); Dotan David Levi, Kiryat Motzkin (IL); Ariel Shahar, Jerusalem (IL); Lior Narkis, Petah-Tikva (IL); Igor Voks, Zichron Yaakov (IL); Noam Bloch, Bat Shlomo (IL); Shay Aisman, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 150 days.

(21) Appl. No.: 17/189,303

(22) Filed: Mar. 2, 2021

(65) Prior Publication Data
US 2022/0283964 A1    Sep. 8, 2022

(51) Int. Cl.
| | |
|---|---|
| *G06F 13/16* | (2006.01) |
| *G06F 9/455* | (2018.01) |
| *G06F 9/46* | (2006.01) |
| *G06F 12/1045* | (2016.01) |
| *G06F 13/38* | (2006.01) |

(Continued)

(52) U.S. Cl.
CPC ...... *G06F 13/1668* (2013.01); *G06F 9/45558* (2013.01); *G06F 9/466* (2013.01); *G06F 12/1054* (2013.01); *G06F 12/1063* (2013.01); *G06F 13/387* (2013.01); *G06F 13/4221* (2013.01); *G06F 15/17331* (2013.01); *G06F 2009/45579* (2013.01)

(58) Field of Classification Search
CPC .. G06F 9/45558; G06F 9/466; G06F 12/1054; G06F 12/1063; G06F 13/1668; G06F 13/387; G06F 13/4221; G06F 15/17331; G06F 2009/45579
See application file for complete search history.

(56) References Cited

U.S. PATENT DOCUMENTS

| | | | |
|---|---|---|---|
| 5,822,749 | A | 10/1998 | Agarwal |
| 5,845,329 | A | 12/1998 | Onishi et al. |
| 5,864,876 | A | 1/1999 | Rossum et al. |

(Continued)

OTHER PUBLICATIONS

"Linux kernel enable the IOMMU—input/output memory management unit support", http://www.cyberciti.biz/tips/howto-turn-on-linux-software-iommu-support.html, pp. 1-5, Oct. 15, 2007.

(Continued)

*Primary Examiner* — Eric T Oberly
(74) *Attorney, Agent, or Firm* — Kligler & Associates

(57) ABSTRACT

A computing system includes at least one peripheral bus, a peripheral device connected to the at least one peripheral bus, at least one memory, and first and second system components. The first system component is (i) associated with a first address space in the at least one memory and (ii) connected to the peripheral device via the at least one peripheral bus. The second system component is (i) associated with a second address space in the at least one memory and (ii) connected to the peripheral device via the at least one peripheral bus. The first system component is arranged to cause the peripheral device to access the second address space that is associated with the second system component.

24 Claims, 3 Drawing Sheets

(51) Int. Cl.
    *G06F 13/42* (2006.01)
    *G06F 15/173* (2006.01)

(56) References Cited

U.S. PATENT DOCUMENTS

| | | | |
|---|---|---|---|
| 5,893,166 | A | 4/1999 | Frank et al. |
| 6,070,219 | A | 5/2000 | McAlpine et al. |
| 6,321,276 | B1 | 11/2001 | Forin |
| 6,629,166 | B1 | 9/2003 | Grun |
| 6,766,467 | B1 | 7/2004 | Neal et al. |
| 6,789,143 | B2 | 9/2004 | Craddock et al. |
| 6,981,027 | B1 | 12/2005 | Gallo et al. |
| 7,171,484 | B1 | 1/2007 | Krause et al. |
| 7,245,627 | B2 | 7/2007 | Goldenberg et al. |
| 7,263,103 | B2 | 8/2007 | Kagan et al. |
| 7,299,266 | B2 | 11/2007 | Boyd et al. |
| 7,464,198 | B2 | 12/2008 | Martinez et al. |
| 7,475,398 | B2 | 1/2009 | Nunoe |
| 7,548,999 | B2 | 6/2009 | Haertel et al. |
| 7,752,417 | B2 | 7/2010 | Manczak et al. |
| 7,809,923 | B2 | 10/2010 | Hummel et al. |
| 7,921,178 | B2 | 4/2011 | Haviv |
| 8,001,592 | B2 | 8/2011 | Hatakeyama |
| 8,010,763 | B2 | 8/2011 | Armstrong et al. |
| 8,051,212 | B2 | 11/2011 | Kagan et al. |
| 8,086,765 | B2 | 12/2011 | Turner et al. |
| 8,255,475 | B2 | 8/2012 | Kagan et al. |
| 8,429,675 | B1 * | 4/2013 | Radhakrishnan ..... G06F 9/5077 719/319 |
| 8,447,904 | B2 | 5/2013 | Riddoch |
| 8,645,663 | B2 | 2/2014 | Kagan et al. |
| 8,745,276 | B2 | 6/2014 | Bloch et al. |
| 8,914,458 | B2 | 12/2014 | Raindel et al. |
| 9,256,545 | B2 | 2/2016 | Raindel et al. |
| 9,298,642 | B2 | 3/2016 | Kagan et al. |
| 9,639,464 | B2 | 5/2017 | Eran et al. |
| 9,696,942 | B2 | 7/2017 | Kagan et al. |
| 2002/0152327 | A1 | 10/2002 | Kagan et al. |
| 2003/0046530 | A1 | 3/2003 | Poznanovic |
| 2004/0221128 | A1 | 11/2004 | Beecroft et al. |
| 2004/0230979 | A1 | 11/2004 | Beecroft et al. |
| 2005/0097183 | A1 | 5/2005 | Westrelin |
| 2006/0190689 | A1 * | 8/2006 | Van Niekerk ....... G06F 12/0284 |
| 2007/0011429 | A1 | 1/2007 | Sangili et al. |
| 2007/0061492 | A1 | 3/2007 | Van Riel |
| 2007/0226450 | A1 | 9/2007 | Engbersen et al. |
| 2007/0283124 | A1 | 12/2007 | Menczak et al. |
| 2008/0098198 | A1 | 4/2008 | Kawamura et al. |
| 2010/0030975 | A1 | 2/2010 | Murray et al. |
| 2010/0077397 | A1 | 3/2010 | Ooi et al. |
| 2010/0095085 | A1 | 4/2010 | Hummel et al. |
| 2010/0217916 | A1 | 8/2010 | Gao et al. |
| 2010/0274876 | A1 | 10/2010 | Kagan et al. |
| 2010/0332789 | A1 | 12/2010 | Sugumar et al. |
| 2011/0023027 | A1 | 1/2011 | Kegel et al. |
| 2011/0307646 | A1 | 12/2011 | Lee et al. |
| 2013/0067193 | A1 * | 3/2013 | Kagan ................. G06F 12/1081 711/206 |
| 2013/0110959 | A1 | 5/2013 | Sharp et al. |
| 2013/0145085 | A1 | 6/2013 | Yu et al. |
| 2014/0185616 | A1 * | 7/2014 | Bloch ................. G06F 9/45533 370/392 |
| 2014/0201421 | A1 * | 7/2014 | Schoenberg ........ G06F 12/1009 711/6 |
| 2016/0294983 | A1 | 10/2016 | Kliteynik et al. |
| 2017/0054659 | A1 * | 2/2017 | Ergin ...................... H04L 47/30 |
| 2017/0272400 | A1 * | 9/2017 | Bansal .................. G06F 9/5077 |
| 2018/0300117 | A1 * | 10/2018 | Ackerman .......... G06F 11/0766 |
| 2019/0005606 | A1 | 1/2019 | Yang |
| 2020/0285498 | A1 * | 9/2020 | Keeth ................. G06F 21/6218 |
| 2020/0319913 | A1 * | 10/2020 | Kumar .................... G06F 9/342 |
| 2022/0197505 | A1 * | 6/2022 | Kannan ............... G06F 11/2028 |

OTHER PUBLICATIONS

Solomon R., "IOV 1.1 Update and Overview", LSI Corporation, Member I/O Virtualization Workgroup, PCI-SIG, PCI Express, pp. 1-45, 2010.
Hummel M., "IO Memory Management Hardware Goes Mainstream", AMD Fellow, Computation Products Group, Microsoft WinHEC, pp. 1-7, 2006.
"MPI: A Message-Passing Interface Standard", Version 2.2, Message Passing Interface Forum, pp. 1-647, Sep. 4, 2009.
InfiniBand Trade Association, "InfiniBandTM Architecture Specification", vol. 1, Release 1.2.1, pp. 1-1727, Nov. 2007.
Shah et al., "Direct Data Placement over Reliable Transports", IETF Network Working Group, RFC 5041, pp. 1-38, Oct. 2007.
Culley et al., "Marker PDU Aligned Framing for TCP Specification", IETF Network Working Group, RFC 5044, pp. 1-75, Oct. 2007.
Welsh et al., "Incorporating Memory Management into User-Level Network Interfaces", Department of Computer Science, Cornell University, Technical Report TR97-1620, pp. 1-10, Feb. 13, 1997.
EP Application # 22159730.5 Search Report dated Jul. 28, 2022.
Shenoy, "Paging and Virtual Memory", CMPSCI 377 Operating Systems, Lecture 14, pp. 1-3, Mar. 9, 2009.

* cited by examiner

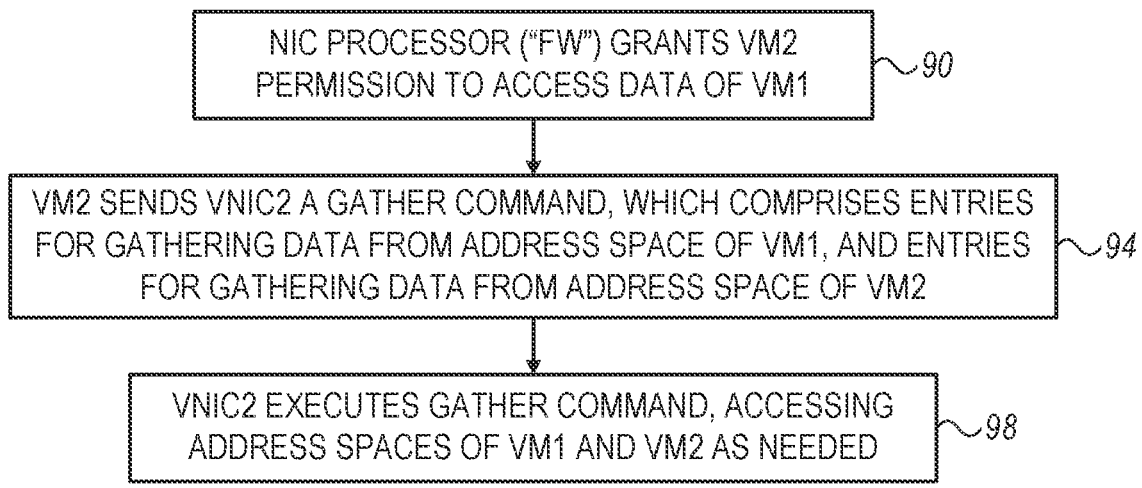
FIG. 3
FIG. 4
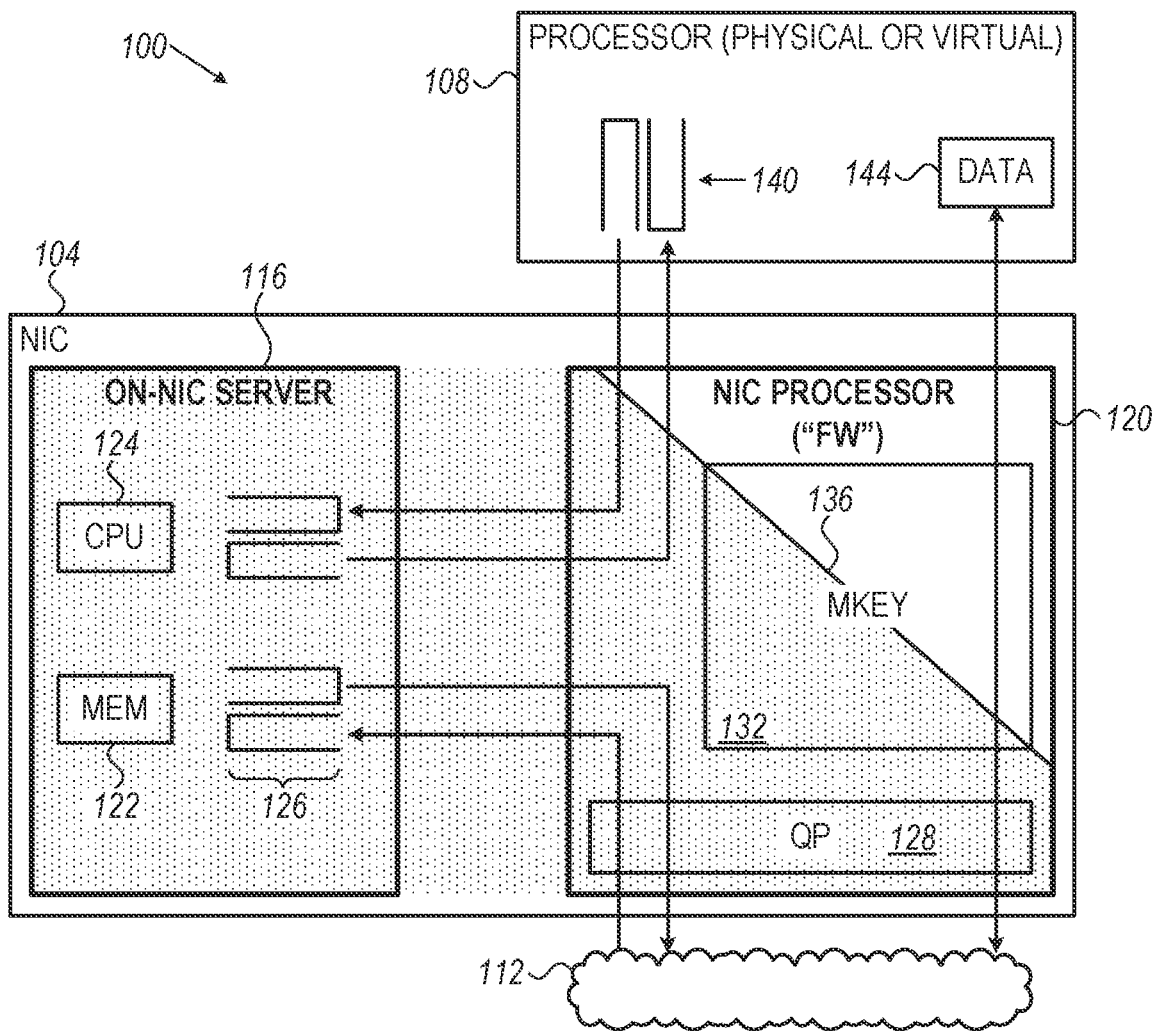

CROSS ADDRESS-SPACE BRIDGING

FIELD OF THE INVENTION

The present invention relates generally to computing systems, and particularly to methods and systems for bridging memory address spaces and address translations in computing system components and peripheral devices.

BACKGROUND OF THE INVENTION

Various types of computing systems comprise peripheral devices that serve various system components over a peripheral bus, e.g., a Peripheral Bus Interconnect express (PCIe) bus. Examples of such systems include a network adapter that connects multiple processors to a network, or a storage device that stores data for multiple processors. Computing systems of this sort typically also comprise a memory in which the system components store data. As part of serving a system component, a peripheral device may access the memory in order to read or write data.

SUMMARY OF THE INVENTION

An embodiment of the present invention that is described herein provides a computing system including at least one peripheral bus, a peripheral device connected to the at least one peripheral bus, at least one memory, and first and second system components. The first system component is (i) associated with a first address space in the at least one memory and (ii) connected to the peripheral device via the at least one peripheral bus. The second system component is (i) associated with a second address space in the at least one memory and (ii) connected to the peripheral device via the at least one peripheral bus. The first system component is arranged to cause the peripheral device to access the second address space that is associated with the second system component.

In an embodiment, one or both of the first and second system components are physical processors. In another embodiment, one or both of the first and second system components are virtual processors. In some embodiments, the first and second system components run on different servers. In other embodiments, the first and second system components run on a same server.

In some embodiments, the first system component is a first virtual processor arranged to access the first address space using a first address translation, the second system component is a second virtual processor arranged to access the second address space using a second address translation, and the system further includes virtualization software, which is configured to define an association between at least part of the first address translation and at least part of the second address translation, and to enable the peripheral device to access the second address space using the association.

In an example embodiment, the peripheral device includes a network adapter, and the virtualization software is configured to define the association between first and second Remote Direct Memory Access (RDMA) Memory Keys (MKEYs) that correspond to the first and second address translations, respectively. In a disclosed embodiment, the first system component is configured to cause the peripheral device to transfer data by Remote Direct Memory Access (RDMA) to the second address space, using a Queue Pair (QP) controlled by the first system component. In an embodiment, the QP, and transferal of the data by RDMA, are associated with a network association of the second system component.

In another embodiment, the first virtual processor is arranged to cause the peripheral device to access the second address space subject to a security policy that governs access to the address spaces. In yet another embodiment, the peripheral device includes a network adapter, which is configured to hold a local copy of the association between the at least part of the first address translation and the at least part of the second address translation, and to access the second address space using the local copy of the association.

In a disclosed embodiment, the second system component is a virtual processor, and the first system component is configured to run virtualization software that (i) allocates physical resources to the virtual processor and (ii) accesses the second address space of the virtual processor. In another embodiment, the second system component is configured to specify to the peripheral device whether the first system component is permitted to access the second address space, and the peripheral device is configured to access the second address space only upon verifying that the first system component is permitted to access the second address space.

In yet another embodiment, the at least one peripheral bus includes a first peripheral bus connected to the first system component, and a second peripheral bus connected to the second system component; and the at least one memory includes a first memory having the first address space and associated with the first system component, and a second memory having the second address space and associated with the second system component. In an embodiment, the second system component runs in a server that is integrated in a network adapter.

In another embodiment, the peripheral device includes a network adapter arranged to transmit packets to a network, the first and second system components have respective first and second network addresses, and the second system component is arranged to (i) construct packets including obtaining portions of the packets from the first address space of the first system component, and (ii) transmit the packets to the network via the network adapter using the second network association. In yet another embodiment, the peripheral device includes a storage device.

In some embodiments, the peripheral device includes a processor that emulates a storage device by exposing a Non-Volatile Memory express (NVMe) device on the peripheral bus. In an example embodiment, the peripheral device that emulates the storage device is a network adapter. In an embodiment, the processor in the peripheral device is configured to complete Input/Output (I/O) transactions for the first system component by accessing the second address space. In an example embodiment, the processor in the peripheral device is configured to access the second address space directly, using Remote Direct Memory Access (RDMA). In a disclosed embodiment, the processor in the peripheral device is configured to complete the I/O transactions using a network association of the second system component.

In some embodiments, the peripheral device includes a network adapter, and the first and second system components run on different physical hosts served by the network adapter.

In some embodiments, the peripheral device is a network adapter configured to emulate a Graphics Processing Unit (GPU) by exposing a GPU function on the peripheral bus. In an embodiment, the second system component is configured to perform network operations on behalf of the emulated GPU.

There is additionally provided, in accordance with an embodiment of the present invention, a computing method including communicating, over at least one peripheral bus, between a peripheral device and a first system component, wherein the first system component is (i) associated with a first address space in at least one memory and (ii) connected to the peripheral device via the at least one peripheral bus, and communicating, over the at least one peripheral bus, between the peripheral device and a second system component, wherein the second system component is (i) associated with a second address space in the at least one memory and (ii) connected to the peripheral device via the at least one peripheral bus. Using the first system component, the peripheral device is caused to access the second address space that is associated with the second system component.

The present invention will be more fully understood from the following detailed description of the embodiments thereof, taken together with the drawings in which:

BRIEF DESCRIPTION OF THE DRAWINGS

FIG. 3 is a flow chart that schematically illustrates a method for address-space bridging, in accordance with an embodiment of the present invention; and FIG. 4 is a block diagram that schematically illustrates a computing and communication system using a Smart-NIC, in accordance with an embodiment of the present invention.

DETAILED DESCRIPTION OF EMBODIMENTS

Overview

Figure 1:
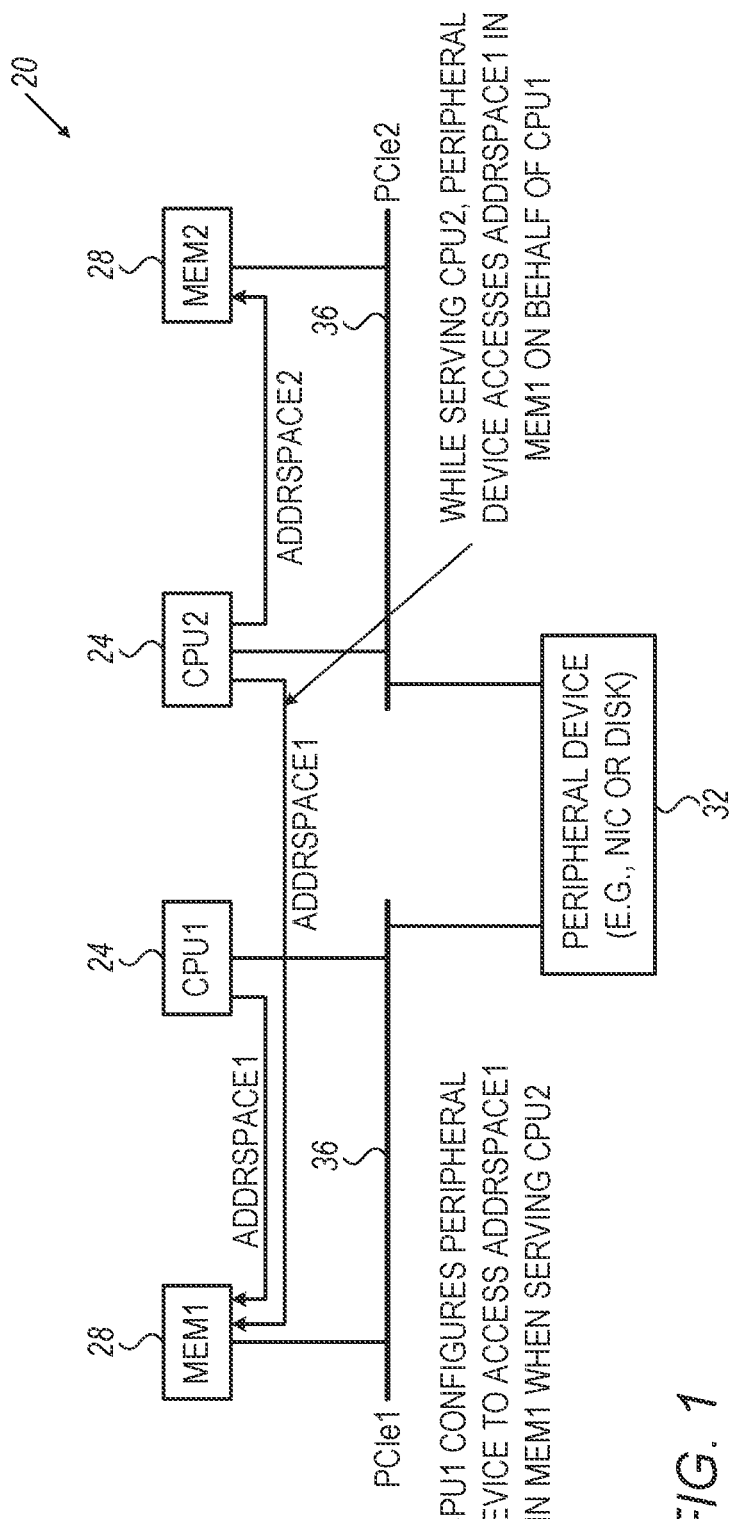
FIG. 1 is a block diagram that schematically illustrates a computing system, in accordance with an embodiment of the present invention.

Various types of computing systems comprise a peripheral device that serves multiple system components over at least one peripheral bus. Examples of such systems include a network adapter that connects multiple processors to a network, or a storage device that stores data for multiple processors. The peripheral bus may comprise, for example, a Peripheral Bus Interconnect express (PCIe) bus.

Any of the system components and/or the peripheral device may be physical or virtual. In a virtualized system, for example, a physical computer hosts one or more Virtual Machines (VMs). The physical computer typically runs virtualization software ("hypervisor") that allocates physical resources to the VMs. Specifically, the hypervisor assigns resources of the peripheral device to the VMs ("virtualizes the peripheral device"). For example, each VM may be assigned a Virtual Network Interface Controller (VNIC) in a physical network adapter, and/or a virtual disk (VDISK) in a physical disk. Typically, each VM, as well as the hypervisor, has a respective network association (also referred to as network identity, one example being an IP address). The hypervisor may provide some services using its own network association, e.g., in storage services provided to VMs. Other services, e.g., VM-to-VM communication, will use the VM's network association.

A computing system of this sort (physical or virtualized) typically also comprises at least one memory, in which the system components are assigned respective address spaces. The address space assigned to a certain system component is typically associated with a respective address translation, e.g., between virtual addresses used by the system component and physical addresses of the memory.

Systems such as described above often enable a peripheral device to access the memory directly while serving a system component. Example use-cases include a network device that scatters and/or gathers packets, a storage device that that services requests and scatters and/or gathers data, or a Remote Direct Memory Access (RDMA) Network Interface Controller (NIC) that performs large memory transactions.

RDMA is a network protocol for transferring data from one memory to another memory. An RDMA endpoint typically uses a Queue Pair (QP) for communication and has network association (e.g., IP address). Remote storage protocols, such as NVMe-over-Fabrics, may be implemented over RDMA to access remote storage. In such protocols, data transfer is initiated by the storage target on the QP of RDMA READ/WRITE, to pass the data. A network device that emulates a local NVMe device typically carries a network association (e.g., IP address) that has QPs to service NVMe commands to NVMe-over-fabrics on top of the QP. The disclosed technique enables RDMA transactions arriving from a storage server to pass to the PCIe bus with the PCIe association of the emulated NVMe device, while the network association is of the network function and the network operation is controlled by the software entity of the network.

In order to enable direct memory access, the peripheral device is typically made aware of the address space and corresponding address translation used by the system component. For example, a VNIC that serves a VM may hold a local copy of the address translation used by the VM, and use this local copy to access the VM's address space in the memory directly. In such an implementation, each address translation may be identified by an identifier, or handle, referred to as "MKEY". The NIC may hold, for example, a Translation and Protection Table (TPT), accessed by {VM identifier, MKEY}, which holds local copies of the various address translations used by the various VMs. MKEYs are primarily used to translate virtual addresses into physical addresses, and to abstract complicated scatter and gather operations.

Conventionally, a given system component (e.g., physical CPU or VM) is only capable of accessing its own address space in the memory, and is entirely unaware of and has no access to address spaces of other system components. A peripheral device, too, is conventionally only able to access the address space of the system component it is assigned to serve.

In various practical use-cases, however, it can be highly beneficial if a peripheral device could access an address space of one system component while serving another system component. Such a capability would enable collaboration between system components in performing complex tasks, while accessing the memory efficiently with minimal address translations and data transfer. Such a capability enables decoupling of the control of the function and its association from the actual data transfer.

Embodiments of the present invention that are described herein provide improved methods and systems, in which a peripheral device is given the capability and permission to access an address space of one system component while serving another system component. In various embodiments, the peripheral device may comprise, for example, a network adapter or a storage device. The system components being served by the peripheral device may comprise, for example, physical processors and/or Virtual Machines (VMs). Communication among the system components and the peripheral device, as well as access to the memory, are performed over at least one bus, e.g., a PCIe bus.

The disclosed techniques are useful in a wide variety of system configurations. Several demonstrative examples are described herein. Some system configurations are entirely physical ("bare metal") configurations, whereas other configurations use virtualization.

For example, in one embodiment the system comprises multiple physical processors (e.g., CPUs or GPUs) that share a peripheral device, e.g., a network adapter. The disclosed technique allows the network adapter to access the address space of one processor while serving another processor.

In another embodiment, the system comprises multiple VMs that are assigned respective virtual NICs (VNICs) in a physical network adapter. The VNICs are configured to access the address spaces of their respective VMs in the memory using RDMA, in accordance with respective MKEYs. Virtualization and resource allocation is the system are typically orchestrated by a hypervisor. In such a system, the disclosed techniques enable one VNIC, which serves a certain VM, to access the address space of another VM. For this purpose, the hypervisor typically defines an association between MKEYs (between an MKEY of the accessing VM and an MKEY of the VM being accessed). The hypervisor typically records the association between MKEYs in the NIC, e.g., in a Translation and Protection Table (TPT). In this manner, the memory-access operations of the VNICs, including accessing one VM on behalf of another, can be performed by the VNICs without involving the VMs.

In some virtualized environments, each virtualized system component is assigned a unique PCIe Bus-Device-Function (BDF), and virtualized peripheral devices use the BDFs for accessing the memory on behalf of system components. When used in such environments, the disclosed techniques enable a peripheral device to access an address space associated with one BDF when serving another BDF ("on behalf of another BDF"). As such, the disclosed technique is sometimes referred to as "cross function bridging"). In the present context, the hypervisor is also considered a system component, which has its own BDF but is able to access address spaces of hosted VMs using the VMs' BDFs.

Typically, the computing system defines a security policy that governs cross-function bridging operations (or otherwise grants or denies system components access to address spaces of other system components). In some embodiments, the security policy is also stored in the TPT along with the association between MKEYs. The security policy may be defined, for example, as permitted pairs of {accessing MKEY, MKEY being accesses}.

It is noted that in some use-cases, the "accessed system component" (the system component whose address space is being accessed) and its memory reside in one physical machine, and the "accessing system component" (the system component that accesses the address space of the accessed system component) resides in a different physical machine. For example, the disclosed technique can be deployed in a multi-host system, in which a peripheral device serves multiple system components (e.g., CPUs or VMs) that reside in two or more different physical computers (e.g., servers). Another example pertains to a "Smart-NIC", i.e., a NIC having an on-NIC server. The disclosed technique can be used to enable the on-NIC server to access address spaces of system components (e.g., CPUs or VMs) served by the Smart-NIC.

The ability of a peripheral device to access an address space of one system component while serving ("on behalf of") another system component is a powerful tool that can be used to enhance the efficiency of many computing tasks. Examples of peripheral devices that can use this tool are, for example, various virtualized peripheral devices that interact with memory, such as network adapters, CPUs, GPUs, Solid State Drives (SSDs) and others. These examples are in no way limiting, and are provided purely by way of example.

Cross-Memory Bridging in "Bare Metal" System

FIG. 1 is a block diagram that schematically illustrates a computing system 20, in accordance with an embodiment of the present invention. System 20 comprises two Central Processing Units (CPUs) 24 denoted CPU1 and CPU2. CPU1 and CPU2 are coupled to respective memories 28 denoted MEM1 and MEM2, in the present example Random Access Memory (RAM) devices. CPU1 and CPU2 communicate with MEM1 and MEM2 via respective Peripheral Bus Interconnect express (PCIe) buses 36, denoted PCIe1 and PCIe2. A PCIe peripheral device 32 is connected to both PCIe buses 36, and is shared by PCU1 and CPU2. Peripheral device 32 may comprise, for example, a network adapter (e.g., a Network Interface Controller—NIC) or a disk. In the present context, CPU1 and CPU2 are examples of system components that are served by the peripheral device.

In one example, system 20 is a multi-host system in which two servers connect to a network via a single NIC. One server comprises CPU1, MEM1 and PCIe1, and the other server comprises CPU2, MEM2 and PCIe2. The system configuration shown in FIG. 1 is, however, merely an example that is chosen purely for the sake of conceptual clarity. Any other suitable configuration can be used in alternative embodiments.

For example, the disclosed techniques are not limited to CPUs, and can be used with any other suitable type of processors or other system components, e.g., Graphics Processing Units (GPUs). As another example, instead of two separate PCIe buses 36, system 20 may comprise a single PCIe bus 36 that connects CPUs 24, memories 28 and peripheral device 32. Additionally or alternatively, instead of two separate memory devices 28, MEM1 and MEM2 may comprise two separate memory regions allocated to CPU1 and CPU2 in the same memory device. Such memory regions need not necessarily be contiguous. As another example, the system may comprise more than a single peripheral device, more than two CPUs (or other processors) and/or more than two memories. For the sake of clarity, however, the description that follows will refer to the example configuration depicted in FIG. 1.

In some embodiments, CPU1 stores and retrieves data in MEM1 by accessing an address space denoted ADDR-SPACE1. CPU2 stores and retrieves data in MEM2 by accessing an address space denoted ADDRSPACE2. Peripheral device 32 is typically aware of ADDRSPACE1 when serving CPU1, and of ADDRSPACE2 when serving CPU2. For example, peripheral device 32 may be configured to read data directly from MEM1 (or to write data directly to MEM1), in accordance with ADDRSPACE1, on behalf of CPU1. Similarly, peripheral device 32 may be configured to read data directly from MEM2 (or to write data directly to MEM2), in accordance with ADDRSPACE2, on behalf of CPU2.

Conventionally, the two address spaces ADDRSPACE1 and ADDRSPACE2 are separate and independent, and each CPU is unaware of the other CPU's address space. In some practical scenarios, however, it is highly efficient for peripheral device 32 to access MEM1 in performing a task for CPU2 (or vice versa).

Consider, for example, an embodiment in which peripheral device 32 is a NIC that connects both CPU1 and CPU2 to a packet communication network. In this example, CPU1 and CPU2 cooperate in transmitting packets to the network, and divide the labor between them. CPU1 prepares the data (payloads) of the packets and saves the payloads in MEM1. CPU2 is responsible for preparing the headers of the packets, saving the headers in MEM2, constructing packets from respective headers and payloads, and transmitting the packets to the network. The packets are transmitted to the network with the network association (e.g., IP address) of CPU2. CPU1 need not be involved or be aware of this process, e.g., CPU2 may obtain data from CPU1 and construct packets, while CPU1 may be requested to read data from a local disk.

In an embodiment, system 20 constructs and transmits the packets with high efficiency, by enabling the NIC to access the packet payloads (which are stored in MEM1) while serving CPU2 (which runs the process of constructing the packets from the headers and payloads).

In an example implementation, CPU1 configures the peripheral device (the NIC in the present example) to access ADDRSPACE1 in MEM1 when serving CPU2. Configuring the NIC by CPU1 typically involves granting the NIC a security permission to access ADDRSPACE1 in MEM1 when serving CPU2.

When the NIC is configured as described above, CPU2 and the NIC carry out the process of constructing and transmitting packets efficiently. In an embodiment, while serving CPU2, the NIC accesses MEM2 (in accordance with ADDRSPACE2) and MEM1 (in accordance with ADDRSPACE1) in alternation (retrieving a header, retrieving the corresponding payload, retrieving the next header, retrieving the corresponding payload, and so on). This process is performed under control of CPU2, without involving CPU1, even though the packet data resides in MEM1.

Cross-Function Bridging in Virtualized System

Figure 2:
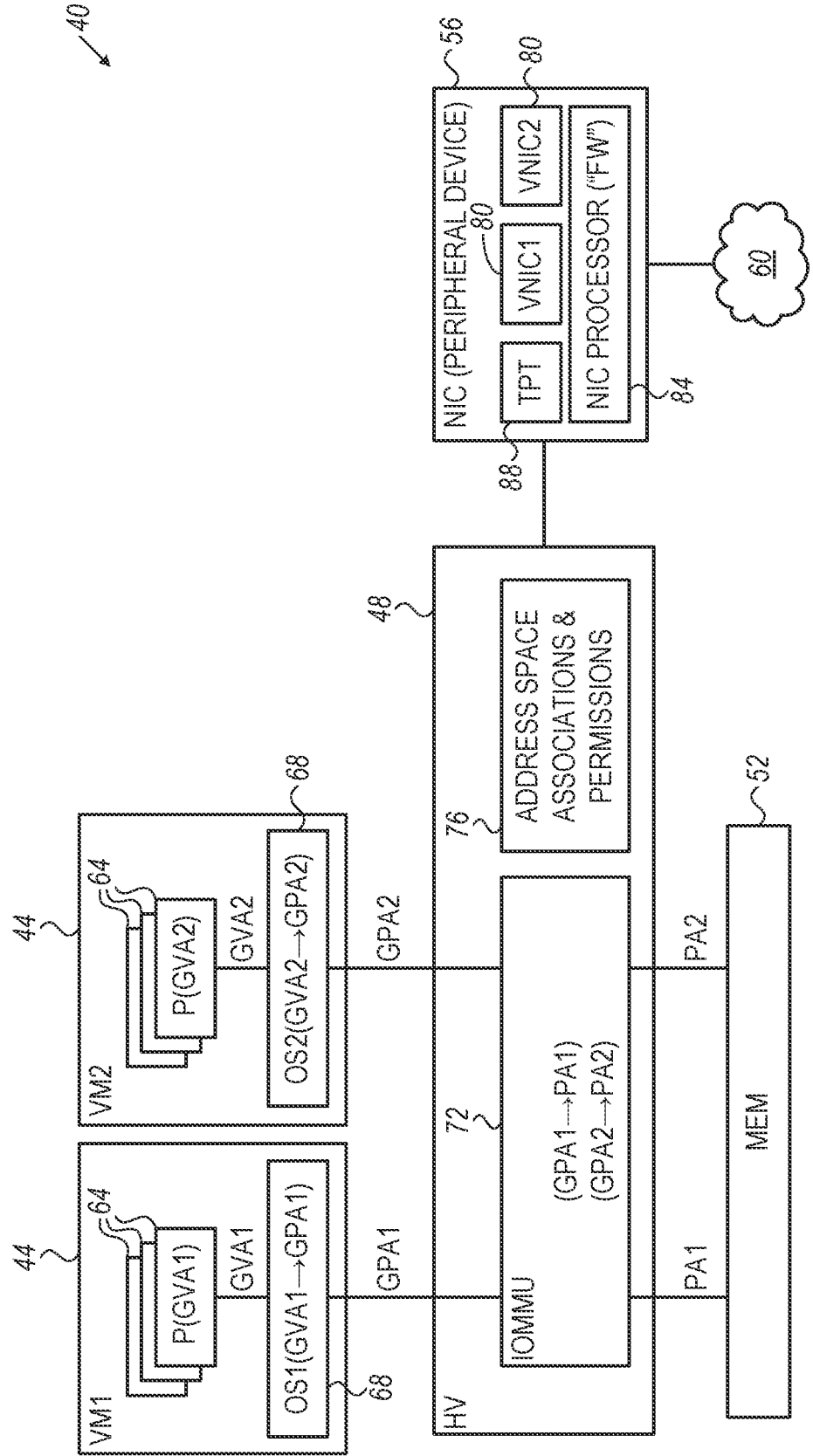
FIG. 2 is a block diagram that schematically illustrates a virtualized computing and communication system, in accordance with an embodiment of the present invention.

FIG. 2 is a block diagram that schematically illustrates a virtualized computing and communication system 40, in accordance with another embodiment of the present invention. System 40 may comprise, for example, a virtualized server running on one or more physical host computers. System 40 comprises multiple Virtual Machines (VMs) 44. For clarity, the figure shows only two VMs, denoted VM1 and VM2. VMs 44 store data in a physical memory 52 (e.g., RAM), and communicate over a packet network 60 via a physical NIC 56. In the present context, VMs 44 are examples of system components, and NIC 56 is an example of a peripheral device that serves them. Typically, although not necessarily, system 40 communicates over network 60 using Remote Direct Memory Access (RDMA).

System 40 comprises a hypervisor (HV) 48 (also referred to herein as "virtualization software"), which allocates physical resources of the hosting computer (e.g., computing, memory, disk and networking resources) to VMs 44. In particular, HV 48 manages storage of data by the VMs in memory 52, and communication of packets by the VMs with NIC 56.

Some physical elements of the system, e.g., a processor or processors hosting the VMs and the HV, and a PCIe bus that connects the processor(s), memory 52 and NIC 56, have been omitted from the figure for clarity. NIC 56 comprises a NIC processor 84 (also referred to as the "firmware" (FW) of the NIC).

In the present example, VM1 runs a guest Operating System (OS) 68 denoted OS1. OS1 runs a virtual CPU (not shown in the figure) that runs one or more software processes 64. Similarly, VM2 runs a guest operating system 68 denoted OS2, which in turn runs a virtual CPU that runs one or more software processes 64. Each process 64 may store and retrieve data in memory 52, and/or send and receive packets via NIC 56. As part of the virtualization scheme, FW 84 of NIC 56 runs two Virtual NICs (VNICs) 80, denoted VNIC1 and VNIC2. VNIC1 is assigned (by HV 48) to VM1, and VNIC2 is assigned (by HV 48) to VM2.

Typically, the flow of data within VMs 44, and among VMs 44, memory 52 and NIC 56, involves multiple address translations between multiple address spaces. In the present example, processes 64 in VM1 write data to memory and read data from memory in accordance with a space of Guest Virtual Addresses (GVAs) denoted GVA1. Guest OS 68 of VM1 (OS1) translates between GVA1 and a space of Guest Physical Addresses (GPAs) denoted GPA1. Similarly, processes 64 in VM2 write data to memory and read data from memory in accordance with a space of GVAs denoted GVA2. Guest OS 68 of VM2 (OS2) translates between GVA2 and a space of GPAs denoted GPA2.

Among other elements, HV 48 runs an Input-Output Memory Management Unit (IOMMU) 72 that manages storage of data in physical memory 52, and in particular translates GVAs into Physical Addresses (PAs). For read and write commands associated with VM1, the IOMMU translates between GPA1 and a space of PAs denoted PA1. For read and write commands associated with VM2, the IOMMU translates between GPA2 and a space of PAs denoted PA2. Storage and retrieval of data in memory 52 is performed in accordance with the PAs.

In some embodiments, when transmitting and receiving packets, VNIC1 is configured to read and/or write data directly in memory 52, on behalf of VM1. Similarly, VNIC2 is configured to read and/or write data in memory 52 directly, on behalf of VM2. A process 64 in a VM 44 may issue an RDMA "scatter" or "gather" command that instructs a VNIC 80 to write or read data to/from a list of address ranges in memory 52.

The RDMA scatter and gather commands are typically expressed in terms of GVAs. In order to carry out a scatter or gather command in memory 52, the VNIC has to translate the GVAs into respective GPAs (which the IOMMU in turn translates into PAs). To simplify this process, in some embodiments NIC 56 comprises a Translation and Protection Table (TPT) 88, which holds GVA⇔GPA translations for the various VMs. Typically, the guest OS of each VM configures TPT 88 with copies of the GVA⇔GPA translations being used. Using TPT 88, VNICs 80 are able to perform GVA⇔GPA address translations locally in NIC 56 without reverting to VMs 44.

As in the "bare metal" example of FIG. 1 above, in virtualized systems such as system 40, too, it is highly advantageous to enable one processor to access an address space of another processor. In the context of the present disclosure and in the claims, a VM 44, which runs a virtual processor such as a virtual CPU, is also regarded herein as a type of processor. Hypervisor 48, too, is regarded herein as a processor.

For example, consider again the example of two processors that cooperate in transmitting packets to the network. In the present embodiment, however, packet transmission is performed by VM1 and VM2 in virtualized system 40 of FIG. 2. VM1 prepares the data (payloads) of the packets and saves the payloads memory 52. VM2 prepares the packet headers, saves the headers in memory 52, constructs packets from respective headers and payloads, and transmits the packets to VNIC2 in NIC 56, for transmission to network 60. The packets are transmitted with the network association (e.g., IP address) of VM2.

As explained above, the task of saving the payloads by VM1 in memory 52 involves multiple address translations:
- The process 64 in VM1 that provides the data writes the payloads to memory in accordance with GVAs in address space GVA1.
- OS1 of VM1 translates the GVAs into GPAs in address space GPA1 (GVA1⇒GPA1).
- IOMMU 72 in HV 48 translates the GPAs into PAs in address space PA1 (GPA1⇒PA1).
- HV 48 stores the payloads in memory 52 in accordance with PA1.

By the same token, the task of saving the headers by VM2 in memory 52 also involves multiple address translations, but with different address spaces:
- The process 64 in VM2 that provides the headers writes the headers to memory in accordance with GVAs in address space GVA2.
- OS2 of VM2 translates the GVAs into GPAs in address space GPA2 (GVA2⇒GPA2).
- IOMMU 72 in HV 48 translates the GPAs into PAs in address space PA2 (GPA2⇒PA2).
- HV 48 stores the headers in memory 52 in accordance with PA2.

In an embodiment, system 40 constructs and transmits the packets with high efficiency, by enabling VNIC2 (which serves VM2) to access both the packet headers (which are stored in memory 52 in accordance with PA2) and the packet payloads (which are stored in memory 52 in accordance with PA1). In the virtualized environment of system 40, this example demonstrates the technique of configuring a peripheral device (VNIC2 in NIC 56 in this example) to access an address space of one processor (GVA1/GPA1 of VM1 in this example) while serving another processor (VM2 in this example).

Configuring VNIC2 in this manner typically involves granting VNIC2 a security permission to access the address spaces of VM1 (GVA1/GPA1) while serving VM2. In some embodiments, HV 48 holds associations 76 between address spaces of different VM2, including the appropriate security permissions.

When VNIC2 is configured as described above, it is able to carry out the process of constructing and transmitting packets efficiently. Typically, VNIC2 accesses the headers (using the address spaces of VM2—GVA2/GPA2/PA2) and the payloads (using the address spaces of VM1—GVA1/GPA1/PA1), both in memory 52, in alternation (retrieving a header, retrieving the corresponding payload, retrieving the next header, retrieving the corresponding payload, and so on). This process is performed for VM2, without involving VM1, even though the packet data was stored by VM1 using the address spaces of VM1.

In some embodiments, the virtualization scheme of system 40 assigns a unique PCIe Bus-Device-Function (BDF) to each VM. Specifically, VM1 and VM2 are assigned different BDFs denoted BDF1 and BDF2, respectively. Using the disclosed technique, hypervisor 48 instructs VNIC2 to access the address space of VM1 using BDF1, on behalf of VM1.

In some embodiments, the disclosed technique is used for enabling hypervisor 48 itself to access the address space of a VM 44 it hosts, on behalf of the VM. In an embodiment, the hypervisor is aware of the BDF of the VM, and uses this BDF to access the VM's address space.

FIG. 3 is a flow chart that schematically illustrates a method for address-space bridging, in accordance with an embodiment of the present invention. The address-space bridging technique is demonstrated using the example of packet transmission, but is in no way limited to this use-case.

The method of FIG. 3 begins with NIC processor 84 of NIC 56 (the "NIC firmware") granting VM2 a security permission to access data belonging to VM1, at an access granting step 90.

At an instructing step 94, VM2 sends VNIC2 a gather command that specifies the construction of the packets to be transmitted. In the present example, the gather command comprises a list of entries that alternate between the address spaces of VM2 and VM1:
- Retrieve header for packet1 from a GVA in GVA2 (of VM2).
- Retrieve payload for packet1 from a GVA in GVA1 (of VM1).
- Retrieve header for packet2 from a GVA in GVA2 (of VM2).
- Retrieve payload for packet2 from a GVA in GVA1 (of VM1).
- Retrieve header for packet3 from a GVA in GVA2 (of VM2).
. . .

At an execution step 98, VNIC2 executes the gather command in memory 52, thereby constructing the packets and transmitting them over network 60.

As can be appreciated, packet reception and separation into headers and payloads can be implemented in a similar manner. In such an embodiment, VNIC2 receives packets, separates each packet to a header and a payload, saves the headers in memory 52 in accordance with the address spaces of VM2, and saves the payloads in memory 52 in accordance with the address spaces of VM1. To carry out this task, VM2 sends VNIC2 a scatter command, which comprises a list of entries that alternate between the address spaces of VM2 and VM1:
- Save header of packet1 in a GVA in GVA2 (of VM2).
- Save payload of packet1 in a GVA in GVA1 (of VM1).
- Save header of packet2 in a GVA in GVA2 (of VM2).
- Save payload of packet2 in a GVA in GVA1 (of VM1).
- Save header of packet3 in a GVA in GVA2 (of VM2).
. . .

Another example use-case for address-space bridging relates to RDMA Scatter and Gather commands. In some embodiments, VM1 can perform an RDMA READ from a remote server, and target the remote read to the memory space of VM2. The fact that this access was performed due to a networking protocol is completely abstracted from VM2.

Yet another example use-case relates to the Non-Volatile Memory express (NVMe) storage protocol. In some embodiments, VM1 may post an NVMe request to the NVMe disk that gathers data from VM2, and write the data to an address in the disk specified by VM1. Control of this operation is performed by VM1.

Another possible use-case relates to NVMe emulation techniques. NVMe emulation is addressed, for example, in U.S. Pat. No. 9,696,942, entitled "Accessing remote storage devices using a local bus protocol," whose disclosure is incorporated herein by reference. In some embodiments, VM2 is exposed to an emulated NVMe function whose commands are terminated by VM1. VM1 performs the appropriate networking tasks to serve these NVMe commands to a remote storage server and instruct the NIC to scatter the data retrieved from the network directly to VM2 buffers in the NVMe command, on behalf of the NVMe function.

The use-cases described above are depicted purely by way of example. In alternative embodiments, the disclosed techniques can be used in various other use-cases and scenarios, and with various other types of peripherals.

Bridging Using MKEY's and TPT

In some embodiments, each GVA⇒GPA address translation in system 40 is identified by a respective handle (also referred to as an "identifier of the translation" or "pointer to the translation"). In the description that follows, this handle is referred to as a Memory Key (MKEY). Typically, MKEYs are assigned by guest OSs 68 of VMs 44, and therefore the MKEY is unique only within the scope of a VM 44.

In some embodiments, when a certain VM defines a new GVA⇒GPA translation and assigns it an MKEY, the VM also stores a copy of this GVA⇒GPA translation in TPT 88 of NIC 56. TPT 88 thus comprises a list of GVA⇒GPA translations that are used by the various processes 64 on the various VMs 44. Since MKEYs are not unique outside the scope of a VM, each GVA⇒GPA translation in TPT 88 is addressed by {MKEY, VM identifier}.

By using the TPT, VNICs 80 in NIC 56 are able to access (read and write) data in memory 62, e.g., for executing scatter and gather commands, without involving the VMs for address translation. The use of TPT 88 enables the VNICs to "zero copy" the data into the process buffer of a VM, using GVAs, i.e., to copy the data without involving the VM's guest operating system.

In some embodiments of the present invention, NIC 56 uses TPT 88 for enabling a VNIC 80, which is assigned to serve one VM 44, to access an address space of another VM 44.

In an embodiment, referring to the packet generation example above, VM2 may have two MKEYs denoted MKEY_A and MKEY_B. MKEY_A points to VM2's own address space, whereas MKEY_B points to an MKEY of VM1. Both MKEY_A and MKEY_B have copies stored in TPT 88. In order for VM2 to access the address space of VM1, VM2 instructs VNIC2 (in NIC 56) to access the memory using MKEY_B.

Thus, for example, in order to construct a sequence of packets, VM2 may send VNIC2 a gather command that alternate between the address space of VM2 (holding the headers) and the address space of VM1 (holding the payloads):

Retrieve header for packet1 from a GVA in GVA2 (of VM2) using MKEY_A.
Retrieve payload for packet1 from a GVA in GVA1 (of VM1) using MKEY_B.
Retrieve header for packet2 from a GVA in GVA2 (of VM2) using MKEY_A.
Retrieve payload for packet2 from a GVA in GVA1 (of VM1) using MKEY_B.
Retrieve header for packet3 from a GVA in GVA2 (of VM2) using MKEY_A.
. . .

VNIC2 typically executes this gather command without involving VM2, by using the copies of the address translations (and respective MKEYs) stored in TPT 88.

A scatter command, e.g., for decomposing packets, can also be implemented by alternating between MKEYs that point to address spaces of different VMs.

In some embodiments, TPT 88 also stores security permissions that specify which VMs are permitted to access which MKEYs of other VMs. In the above example, for instance, VM1 initially specifies in TPT 88 that VM2 is permitted to access the address space of VM1 (holding the payloads) using MKEY_B. When NIC processor 84 (the NIC "FW") receives a request from VNIC2 to access the address space of VM1 using MKEY_B, it will grant the request only if TPT 88 indicates that this access is permitted. In the above security mechanism there is no centralized entity that defines security privileges. Rather, each VM specifies which VMs (if any) are permitted to access its memory space, and using which MKEYs.

Smart-NIC, Emulated NVME Storage Device, and Decoupling Data Plane from Control Plane In paravirtualization, as is known in the art, a hypervisor emulates a network or storage (e.g., SSD) function. At a lower level the hypervisor serves requests by translating the addresses into its own address space, adding headers or performing some logic, and transmitting to the network or storage with the hypervisor's own network association (sometimes referred to as an underlay network). In some disclosed embodiments, such functions may be carried out by a peripheral device, e.g., by a hypervisor running on a different server or within a network adapter. Instead of performing the address translation by the hypervisor, the hypervisor may use the disclosed techniques to request the peripheral device to perform the DMA operation on its behalf, in which case the address translation will be performed by the IOMMU.

FIG. 4 is a block diagram that schematically illustrates a computing and communication system 100, in accordance with another embodiment of the present invention. This example is used for demonstrating several aspects of the disclosed techniques—(i) implementation using a "Smart-NIC", (ii) implementation of an emulated NVME storage device, and (iii) decoupling between the control plane and data plane. This example also demonstrates how a first system component can cause a peripheral device to transfer data by RDMA to a second address space (associated with a second system component), using a Queue Pair (QP) controlled by the first system component. The data carries the network association (e.g., IP address) of the second system component.

System 100 comprises a NIC 104 and a processor 108. NIC 104 is used for connecting processor 108 to a network 112. Processor 108 may comprise a physical processor (e.g., CPU or GPU) or a virtual processor (e.g., a virtual CPU of a VM running on a hosting physical computer). NIC 104 is referred to as a "Smart-NIC" because, in addition to a NIC processor ("FW") 120, it comprises an on-NIC server 116. On-NIC server 116 comprises a memory 122 and a CPU 124. CPU 124 is configured to run an operating system and general-purpose software.

In the present example, processor 108 comprises a memory 144 in which it stores data. Processor 108 stores the data in accordance with an address translation having an MKEY denoted MKEY_A. CPU 124 of on-NIC server 116 is assigned another MKEY denoted MKEY_B. In order to transmit data efficiently from memory 144 to network 112, and/or receive data efficiently from network 112 to memory 144, processor 108 configures CPU 124 of on-NIC server 116 to access the data in memory 144 on its behalf. CPU 124 may be unaware of the memory accesses performed by on-NIC server 116.

In an embodiment, NIC processor 120 of NIC 104 comprises a TPT 132 that, as explained above, holds copies of the address translations used by processor 108 and by CPU 124, including MKEY_A and MKEY_B. TPT 132 further indicates that CPU 124 is permitted to access the data in memory 144 on behalf of processor 108. The permission may be indicated, for example, as an association between MKEY_A and MKEY_B.

A diagonal line 136 in the figure marks the boundary between the part of system 100 associated with MKEY_A and the part associated with MKEY_B. The part associated with MKEY_B (to the left of line 136) is shown in the figure with a shaded pattern, whereas the part associated with MKEY_A (above line 136) is shown with a clear pattern. The figure demonstrates the boundary created between the two VNICs (the VNIC of processor 108 and the VNIC of on-NIC server 116) and to show that the two memory keys in each domain are tightly coupled.

As seen, the control path for transmission and reception of data between network 112 and memory 144 comprises (i) queues 140 in processor 108, (ii) queues 126 in on-NIC server 116, and Queue Pairs (QPs) 128 in NIC processor 120. The data path for the data transmission, on the other hand, is direct between memory 144 and network 112, via NIC processor 120. In particular, the data path does not traverse on-NIC server 116.

In an example implementation of a virtualized system, Smart-NIC 104 serves one or more servers, each of which hosts multiple VMs 108. On-NIC server 116 in this example runs a hypervisor that serves the various VMs. The disclosed technique enables the hypervisor (running on CPU 124) to access the memories and address spaces of the various VMs 108.

Multi-Host Use-Case

In some cases, the peripheral device is configured to connect to multiple hosts. In such an architecture (referred to as "multi-host") a given virtualized device ("logical device") serves multiple hosts having respective physical and virtual address spaces in memory. A device of this sort may comprise, for example, a network adapter supporting multi-host, or a dual-port storage device (e.g., Solid State Drive—SSD). Multi-host operation is addressed, for example, in U.S. Pat. No. 7,245,627, entitled "Sharing a network interface card among multiple hosts," whose disclosure is incorporated herein by reference. In some embodiments, using the disclosed bridging technique, such a peripheral device is able to access an address space of one host on behalf on another host.

Use-Cases with Peripheral Device Connected to FPGA or GPU

In some embodiments, the peripheral device comprises a network adapter (e.g., NIC) that is connected to an additional device, which serves the various processors (e.g., hosts and/or VMs, physical or virtual). Unlike the Smart-NIC use-case, however, the additional device in the present use-case is not a server. The additional device may comprise, for example, a Field-Programmable Gate Array (FPGA) or Graphics Processing Unit (GPU). In one example use-case, the additional device (e.g., FPGA or GPU) is to be accessible to, and shard by, the entire PCIe topology connected to the NIC.

For example, a device of this sort can support Single Root Input/Output Virtualization (SRIOV) and enable the disclosed techniques similarly to network adapters and storage devices as described above. In some embodiments, one or more FPGAs and/or GPUs can be emulated and abstracted to the VMs by a PCIe endpoint, with a certain VM serving the various emulated GPUs/FPGAs using the disclosed technique.

Use-Cases with Peripheral Device Emulated as NVME Device

In some embodiments, the peripheral device (e.g., a Smart-NIC) exposes itself on the PCIe bus as a Non-Volatile Memory express (NVMe)-compliant storage device or any other suitable storage interface on PCIe. Internally, however, the peripheral device comprises a processor (e.g., microcontroller) that virtualizes an actual physical storage device. The physical storage device may be located locally or remotely. Using the disclosed technique, the processor is able to access the address spaces of various processors (physical or virtual) on their behalf (e.g., access the address space of a VM on behalf of the VM) to complete IO transactions.

Completing the transactions may comprise using RDMA operations on a QP/Ethernet NIC associated with the serving VM to a remote storage, which in turn will perform network transactions (either RDMA or not) directly towards the buffers that are specified in the NVMe request in the VM that sees NVMe emulation. This VM is not aware of the network protocol in the emulated device and is not aware of RDMA or MKEYs. The VM simply issues an NVMe request with scatter gather that was served by another VM that performs all networking tasks.

The configurations of the various systems, hosts, peripheral devices and other elements shown in FIGS. 1, 2 and 4, and their various components, are example configurations that are depicted purely for the sake of conceptual clarity. Any other suitable configurations can be used in alternative embodiments.

In various embodiments, the elements of the various systems, hosts, peripheral devices and other elements shown in FIGS. 1, 2 and 4, may be implemented using suitable hardware, such as one or more Application-Specific Integrated Circuits (ASIC) or Field-Programmable Gate Arrays (FPGA), using software, or using a combination of hardware and software elements.

In some embodiments, some or all functions of certain system elements described herein may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing system, comprising:
   at least one peripheral bus;
   at least one memory;
   at least one host, which is connected to the at least one peripheral bus and is to run (i) a first Virtual Machine (VM) having a first network association and associated with a first address space in the at least one memory and (ii) a second VM having a second network association and associated with a second address space in the at least one memory; and
   a physical network adapter, to transmit packets to a network, the physical network adapter connected to the at least one peripheral bus and is to run (i) a first Virtual Network Interface Controller (VNIC) assigned to serve the first VM and (ii) a second VNIC assigned to serve the second VM,
   wherein the second VNIC is to:
     receive from the second VM a command that instructs the second VNIC to access both the first address space of the first VM and the second address space of the second VM; and
     execute the command as part of serving the second VM, including accessing both the first address space of the first VM and the second address space of the second VM, and
   wherein the second VM is arranged to (i) construct the packets including obtaining portions of the packets from the first address space of the first VM, and (ii) transmit the packets to the network via the physical network adapter using the second network association.

2. The system according to claim 1, wherein the first and second VMs run on different servers.

3. The system according to claim 1, wherein the first and second VMs run on a same server.

4. The system according to claim 1,
   wherein the first VM is to access the first address space using a first address translation;
   wherein the second VM is to access the second address space using a second address translation;
   and comprising virtualization software, which is configured to define an association between at least part of the first address translation and at least part of the second address translation, and to enable the second VNIC to access the first address space using the association.

5. The system according to claim 4, wherein the virtualization software is configured to define the association between first and second Remote Direct Memory Access (RDMA) Memory Keys (MKEYs) that correspond to the first and second address translations, respectively.

6. The system according to claim 4, wherein the second VNIC is to access the first address space subject to a security policy that governs access to the address spaces.

7. The system according to claim 4, wherein the second VNIC is configured to hold a local copy of the association between the at least part of the first address translation and the at least part of the second address translation, and to access the first address space using the local copy of the association.

8. The system according to claim 1, wherein:
   the at least one peripheral bus comprises a first peripheral bus connected to a first host running the first VM, and a second peripheral bus connected to a second host running the second VM; and
   the at least one memory comprises a first memory having the first address space and associated with the first VM, and a second memory having the second address space and associated with the second VM.

9. The system according to claim 1, wherein the second VM runs in a server that is integrated in the physical network adapter.

10. The system according to claim 1, wherein the first and second VMs run on different physical hosts served by the physical network adapter.

11. The system according to claim 1, wherein the command is a scatter command that scatters data to a list of addresses, the list alternating between the first address space and the second address space.

12. The system according to claim 1, wherein the command is a gather command that gathers data from a list of addresses, the list alternating between the first address space and the second address space.

13. A computing method, comprising:
   running, on at least one host that communicates with a physical network adapter over at least one peripheral bus, a first Virtual Machine (VM) having a first network association and associated with a first address space in at least one memory;
   further running, on the at least one host, a second VM having a second network association and associated with a second address space in the at least one memory;
   running in the physical network adapter (i) a first Virtual Network Interface Controller (VNIC) assigned to serve the first VM and (ii) a second VNIC assigned to serve the second VM;
   receiving in the second VNIC, from the second VM, a command that instructs the second VNIC to access both the first address space of the first VM and the second address space of the second VM; and
   executing the command by the second VNIC as part of serving the second VM, including accessing both the first address space of the first VM and the second address space of the second VM,
   wherein the physical network adapter is arranged to transmit packets to a network, and comprising performing, by the second VM: (i) constructing the packets including obtaining portions of the packets from the first address space of the first VM, and (ii) transmitting the packets to the network via the physical network adapter using the second network association.

14. The method according to claim 13, wherein the first and second VMs run on different servers.

15. The method according to claim 13, wherein the first and second VMs run on a same server.

16. The method according to claim 13,
   wherein the first VM is to access the first address space using a first address translation;
   wherein the second VM is to access the second address space using a second address translation;
   and comprising, using virtualization software, defining an association between at least part of the first address translation and at least part of the second address translation, and enabling the second VNIC to access the second address space using the association.

17. The method according to claim 16, wherein defining the association comprises defining the association between first and second Remote Direct Memory Access (RDMA) Memory Keys (MKEYs) that correspond to the first and second address translations, respectively.

18. The method according to claim 16, wherein accessing the first address space by the second VNIC is subject to a security policy that governs access to the address spaces.

19. The method according to claim 16, wherein accessing the first address space comprises holding in the second VNIC a local copy of the association between the at least part of the first address translation and the at least part of the second address translation, and accessing the first address space using the local copy of the association.

20. The method according to claim 13, wherein:
the at least one peripheral bus comprises a first peripheral bus connected to a first host running the first VM, and a second peripheral bus connected to a second host running the second VM; and
the at least one memory comprises a first memory having the first address space and associated with the first VM, and a second memory having the second address space and associated with the second VM.

21. The method according to claim 13, wherein the second VM runs in a server that is integrated in the physical network adapter.

22. The method according to claim 13, wherein the first and second VMs run on different physical hosts served by the physical network adapter.

23. The method according to claim 13, wherein executing the command comprises executing a scatter command by scattering data to a list of addresses, the list alternating between the first address space and the second address space.

24. The method according to claim 13, wherein executing the command comprises executing a gather command by gathering data from a list of addresses, the list alternating between the first address space and the second address space.

* * * * *